United States Patent
Yamamuro

(10) Patent No.: US 12,140,452 B2
(45) Date of Patent: Nov. 12, 2024

(54) DISPLACEMENT MEASURING APPARATUS

(71) Applicant: MITUTOYO CORPORATION, Kawasaki (JP)

(72) Inventor: Masataka Yamamuro, Tochigi (JP)

(73) Assignee: MITUTOYO CORPORATION, Kawasaki (JP)

( * ) Notice: Subject to any disclaimer, the term of this patent is extended or adjusted under 35 U.S.C. 154(b) by 16 days.

(21) Appl. No.: 17/589,019

(22) Filed: Jan. 31, 2022

(65) Prior Publication Data
US 2022/0252436 A1    Aug. 11, 2022

(30) Foreign Application Priority Data
Feb. 8, 2021    (JP) ................... 2021-018626

(51) Int. Cl.
| | |
|---|---|
| *G01D 11/24* | (2006.01) |
| *G01D 5/20* | (2006.01) |
| *G01D 5/24* | (2006.01) |
| *G01D 5/347* | (2006.01) |

(52) U.S. Cl.
CPC ............ *G01D 11/245* (2013.01); *G01D 5/20* (2013.01); *G01D 5/24* (2013.01); *G01D 5/34707* (2013.01)

(58) Field of Classification Search
CPC .......... G01D 11/245; G01D 5/20; G01D 5/24; G01D 5/34707
See application file for complete search history.

(56) References Cited

U.S. PATENT DOCUMENTS

| | | | | |
|---|---|---|---|---|
| 2008/0094593 A1* | 4/2008 | Shibazaki | ........... | G03F 7/70716 356/509 |
| 2008/0315076 A1* | 12/2008 | Kusano | .............. | G01D 5/34784 250/231.1 |
| 2015/0276435 A1* | 10/2015 | Mori | .................. | G01D 5/34761 250/231.1 |

(Continued)

FOREIGN PATENT DOCUMENTS

| | | | | |
|---|---|---|---|---|
| JP | H5-288571 A | 11/1993 | | |
| JP | H11220863 | * 8/1999 | ............. | H02K 21/14 |
| JP | H11337309 | * 12/1999 | ............. | G01B 11/00 |

(Continued)

OTHER PUBLICATIONS

Japanese Office Action dated Jul. 9, 2024 issued in corresponding Japanese application No. 2021-018626; English machine translation included (12 pages).

*Primary Examiner* — Alexander Satanovsky
*Assistant Examiner* — Sharah Zaab
(74) *Attorney, Agent, or Firm* — Rankin, Hill & Clark LLP

(57) ABSTRACT

There is provided a displacement measuring apparatus capable of being used in a vacuum environment. The displacement measuring apparatus includes a scale and a detection head part disposed in such a manner as to be relatively displaceable to the scale and as to face the scale with a predetermined gap. The detection head part detects a displacement or position relative to the scale. The scale is disposed in a vacuum. The detection head part is housed in a housing holder separating an atmospheric environment side from a vacuum environment side. In a gap between the detection head part and the scale, the housing holder includes a relay means for passing a detection signal between the detection head part and the scale.

8 Claims, 4 Drawing Sheets

(56) References Cited

U.S. PATENT DOCUMENTS

2019/0360841 A1* 11/2019 Seo .................... H05K 13/0406

FOREIGN PATENT DOCUMENTS

| JP | 2004-53604 A | 2/2004 |
| --- | --- | --- |
| JP | 2004-163202 A | 6/2004 |
| JP | 2010-532154 A | 9/2010 |
| JP | 2011-059055 | 3/2011 |
| JP | 5286584 | 6/2013 |
| JP | 2019-190859 A | 10/2019 |
| JP | 2020-193929 | 12/2020 |

* cited by examiner

DISPLACEMENT MEASURING APPARATUS

INCORPORATION BY REFERENCE

This application is based upon and claims the benefit of priority from JP patent application No. 2021-018626, filed on Feb. 8, 2021 (DAS code E73F), the disclosure of which is incorporated herein in its entirety by reference.

BACKGROUND OF THE INVENTION

1. Field of the Invention

The present invention relates to a displacement measuring apparatus, and particularly relates to a displacement measuring apparatus capable of being used in a vacuum environment.

2. Description of Related Art

Encoders (displacement measuring apparatuses) are widely used as position detectors for position control of machine elements. If a machine element whose position to be controlled is installed in a vacuum environment, an encoder (displacement measuring apparatus) is also used in the vacuum environment.
Patent Literature 1: JP 2020-193929 A
Patent Literature 2: JP 2011-59055 A
Patent Literature 3: JP 5286584 B

SUMMARY OF THE INVENTION

However, there are following problems when an existing encoder (displacement measuring apparatus) is disposed in a vacuum. Since an encoder does not necessarily have a vacuum-compatible structure, outgas is generated from resin parts or adhesives used in the encoder, which has caused a concern that such gas affects the vacuum level. If all the parts (materials) of the encoder are changed to be vacuum compatible, redesign and empirical research are required to achieve an equivalent level of measurement accuracy to that of an existing encoder, and this takes considerable costs, man-hours, and time.

For this reason, there is a demand for a vacuum-compatible displacement measuring apparatus having an equivalent level of performance to that of an existing encoder without increasing the cost.

A displacement measuring apparatus according to an exemplary embodiment of the present invention includes:
  a scale; and
  a detection head part disposed in such a manner as to be relatively displaceable to the scale and as to face the scale with a predetermined gap and configured to detect a displacement or position relative to the scale, wherein
  the scale is disposed in a vacuum,
  the detection head part is disposed in an atmosphere,
  the detection head part is housed in a housing holder separating an atmospheric environment side from a vacuum environment side, and
  the housing holder includes, in the gap between the detection head part and the scale, a relay means for passing a detection signal between the detection head part and the scale.

In an exemplary embodiment of the present invention, it is preferable that the displacement measuring apparatus is a photoelectric encoder, and that the relay means is a light-transmissive window.

In an exemplary embodiment of the present invention, it is preferable that the detection head part has a telecentric optical system, In an exemplary embodiment of the present invention, it is preferable that the scale has a pseudo random pattern.

In an exemplary embodiment of the present invention, it is preferable that the scale is a glass scale.

In an exemplary embodiment of the present invention, it is preferable that the displacement measuring apparatus is an electrostatic capacitance encoder, and that the relay means is a dielectric or a divided conductor.

In an exemplary embodiment of the present invention, it is preferable that the displacement measuring apparatus is an electromagnetic induction encoder, and that the relay means is a dielectric or a conductor, except for a magnetic substance.

A method of installing the displacement measuring apparatus according to an exemplary embodiment of the present invention, the method includes:
  disposing the scale in a vacuum environment;
  housing the detection head part in a housing holder separating an atmospheric environment side from a vacuum environment side; and
  disposing an assembly of the housing holder housing the detection head part in such a manner as to face the scale with a predetermined gap.

DETAILED DESCRIPTION

Figure 1:
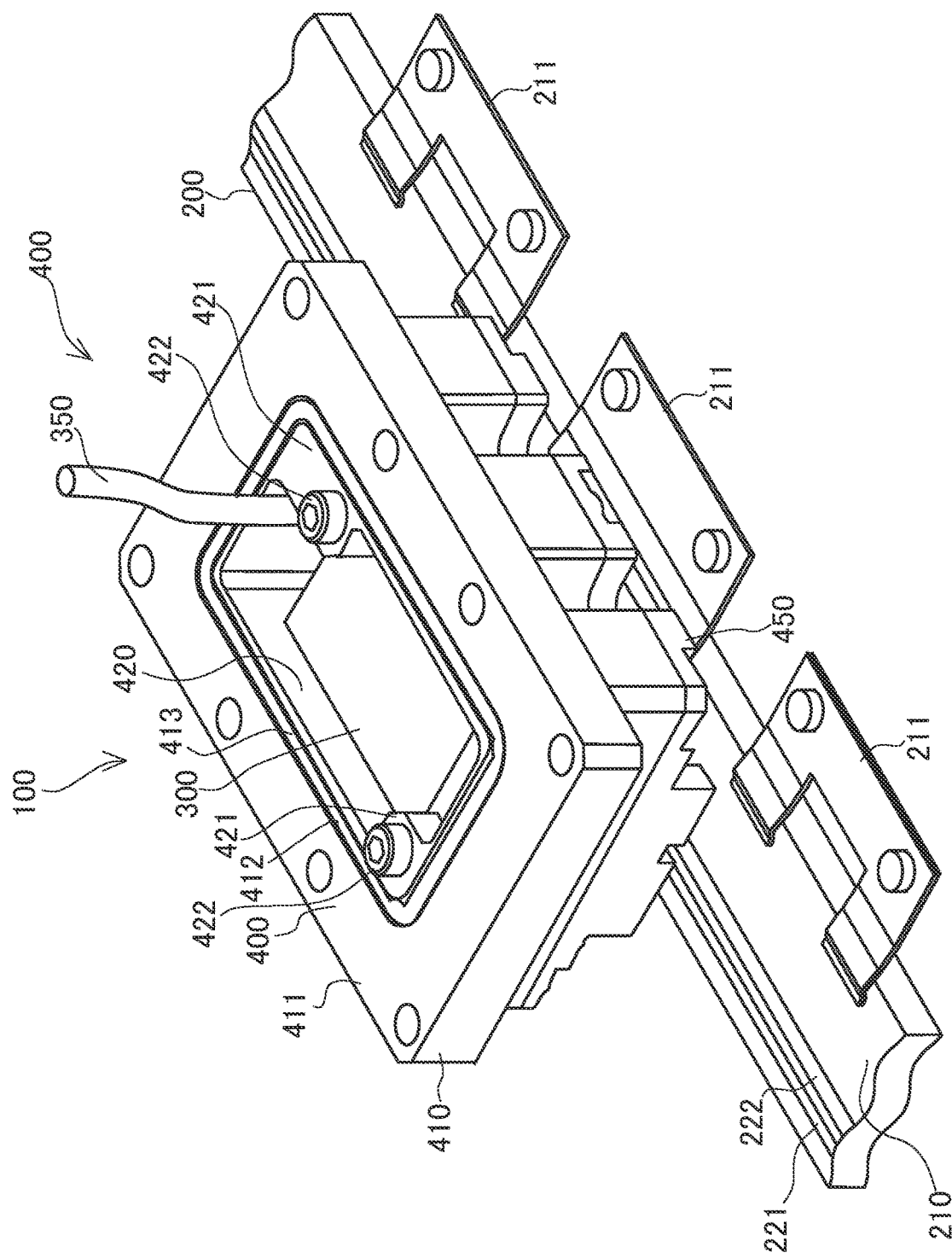
FIG. 1 is an external perspective view of a displacement measuring apparatus according to a first exemplary embodiment.

An exemplary embodiment of the present invention is illustrated and described with reference to the reference signs attached to the elements in the drawings.

First Exemplary Embodiment

FIG. 1 is an external perspective view of a displacement measuring apparatus 100 according to a first exemplary embodiment of the present invention.

The displacement measuring apparatus 100 according to the present embodiment is capable of being used in a vacuum environment. Note that, the entire displacement measuring apparatus 100 is not disposed in a vacuum, and a scale 200 is disposed in a vacuum environment while a detection head part 300 is disposed in an atmospheric environment. In other words, when it is assumed that one of two machine elements that move relative to each other is in a vacuum environment and that the other of the machine elements is in an atmospheric environment, the scale 200 is provided to the one of the machine elements, and the detection head part 300 is provided to the other of the machine elements. This is because that the detection head part 300 is disposed in an atmospheric environment to be separated from a vacuum since the detection head part 300 contains gas generating factors such as resin parts and adhesives. In the following, the present embodiment is described using a reflective photoelectric encoder as an example.

The displacement measuring apparatus 100 includes the scale 200, the detection head part 300, and a housing holder 400.

The scale 200 includes a scale substrate 210 having an elongate flat-thin-plate shape, and a scale pattern provided along the positioning direction (longitudinal direction) of the scale substrate 210. In this specification, the scale substrate 210 is a glass substrate. The scale 200 is disposed by, for example, being pressed down by multiple plate springs 211.

The scale pattern is formed by arranging bright and dark parts, that is, light-reflecting and light-transmitting parts in a predetermined form. As the scale pattern, multiple (two or more) tracks 221 and 222 are provided. In this specification, the scale pattern has two tracks 221 and 222, and the first scale pattern track 221 is a pseudo random pattern.

When a predetermined length section is extracted, the pseudo random pattern only has one pattern for the predetermined length section in the measurement range, and pattern matching can determine where the section is on the scale 200. That is, the first scale pattern track 221 is for absolute position measurement. In addition, the pseudo random pattern is highly robust because some errors in reading the pattern can be corrected if the reading range of the detection head part 300 is set wide to have redundancy. Meanwhile, the pseudo random pattern does not have high responsiveness because it takes some time for pattern matching calculation processing.

The second scale pattern track 222 is a periodic pattern in which bright and dark parts are repeated at a predetermined pitch. The second scale pattern track 222 is what is called an incremental track, which has high responsiveness but causes measurement errors if the pattern is erroneously detected due to changes in light intensity (signal intensity).

Figure 2:
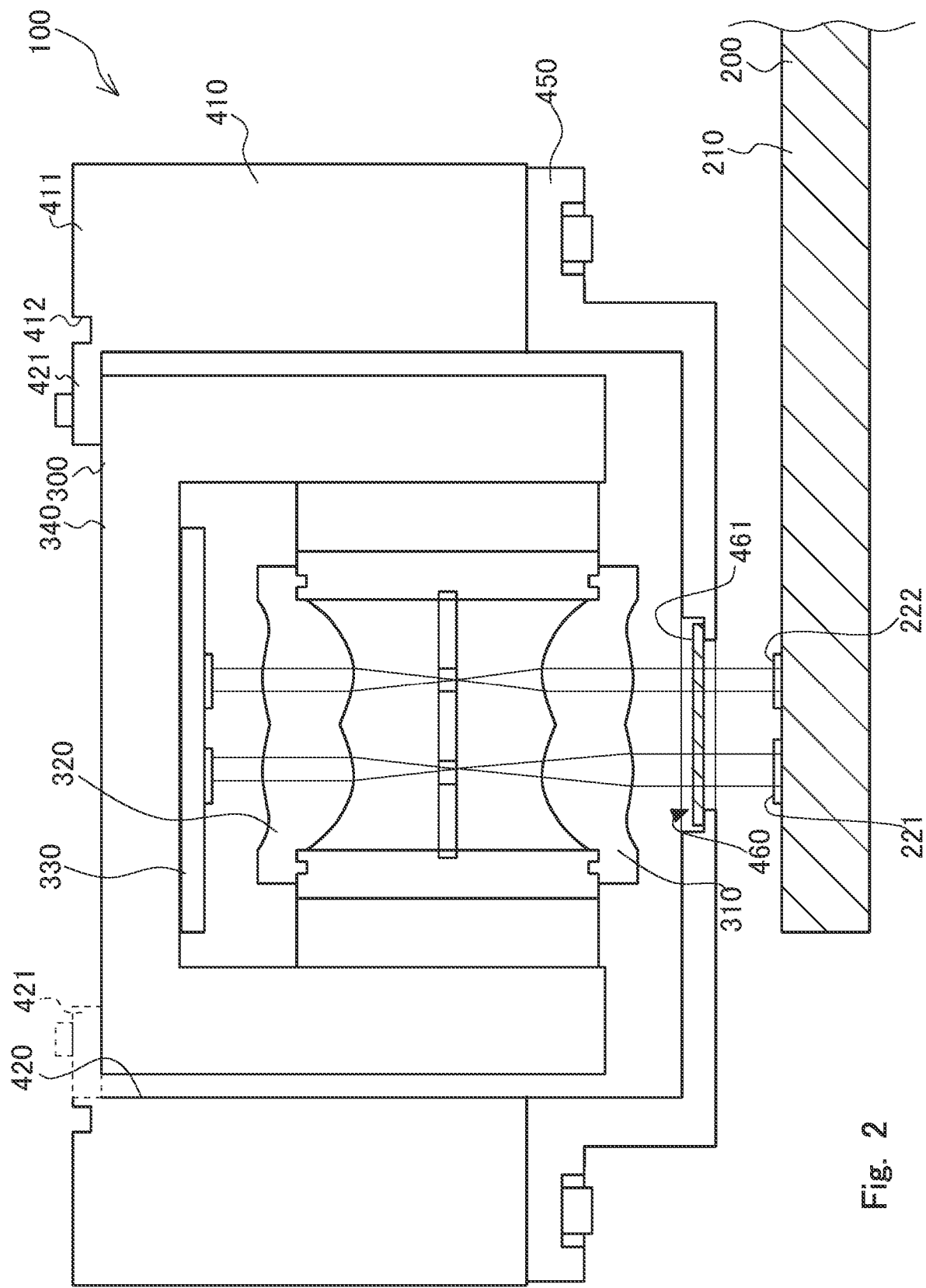
FIG. 2 is a diagram schematically showing a section of the displacement measuring apparatus.

The detection head part 300 reads the scale pattern of the scale 200 to detect the displacement or position relative to the scale 200. The detection head part 300 is disposed in such a manner as to be relatively displaceable in the positioning direction (longitudinal direction) of the scale 200 and as to face the scale 200 with a predetermined gap. FIG. 2 is a diagram schematically showing a section of the displacement measuring apparatus 100. The detection head part 300 includes a light source part, a lens optical system (310 and 320), a reception part 330, and a casing 340.

The light source part includes two light sources (LEDs), and a first light source for the first track 221 and a second light source for the second track 222 are arranged in parallel, Note that, the light sources are omitted in FIG. 2. The direction of light from a light source (detection signal) is changed by the reflection of a mirror (half mirror) or the like, thereby the light is introduced to the lens optical systems.

As the lens optical system, a bilateral telecentric optical system is employed. The lens optical system includes an objective lens unit 310 and an imaging lens unit 320. The objective lens unit 310 irradiates the scale 200 with light from the light source part. The imaging lens unit 320 condenses reflected light from the scale 200 toward the reception part 330. The objective lens unit 310 and the imaging lens unit 320 each have a structure (lens array) in which a lens for the first track 221 and a lens for the second track 222 are integrally arranged in parallel. Then, the light source part (not illustrated) is disposed at the focal point of the objective lens unit 310.

Accordingly, the light emitted from the light source part passes through the objective lens unit 310 and is applied on the scale 200 as parallel light. Thus, the gap between the detection head part 300 and the scale 200 can be relatively widened. In addition, permissible values for assembling errors when the encoder is to be installed can be also increased. In other words, when the encoder is to be installed, the gap between the detection head part 300 and the scale 200 is only required to be within a certain permissible range even if it is slightly widened from a specified value. In addition, permissible values for variation of the gap between the detection head part 300 and the scale 200 can be increased, The reception part 330 is provided with a photodetector that performs photoelectric conversion. The photodetector is, for example, a photodetector array or a (one-dimensional or two-dimensional) CCD (CMOS) camera.

Figure 3:
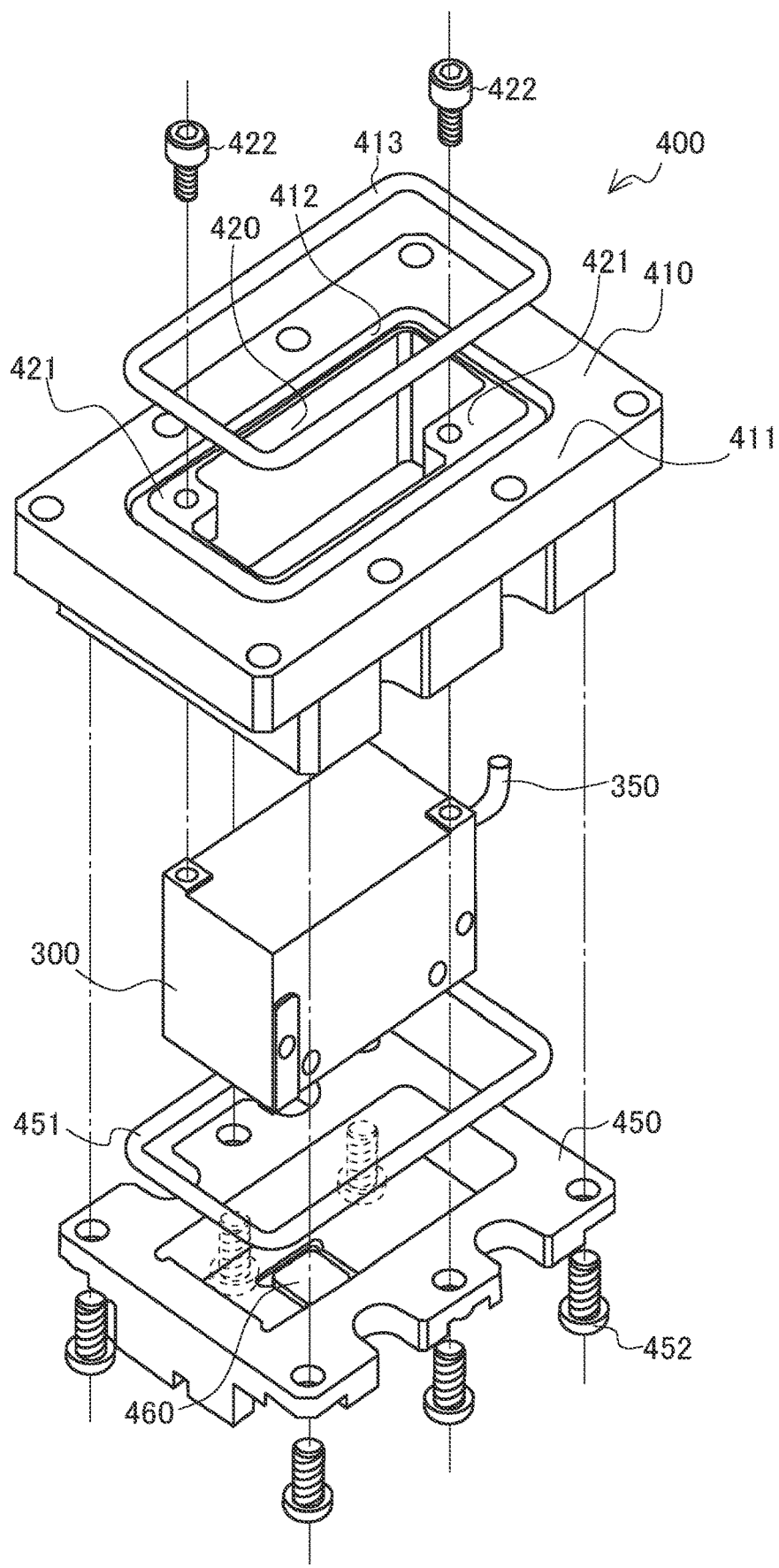
FIG. 3 is an exploded perspective view of a housing holder.

FIG. 3 is an exploded perspective view of the housing holder 400.

The housing holder 400 houses the detection head part 300 and separates an atmospheric environment side from a vacuum environment side. The housing holder 400 includes a holder frame part 410 and a holder base part 450. The holder frame part 410 has a cylindrical shape and fixedly holds the detection head part 300 in a cylindrical hole 420. The holder frame part 410 has a low-height quadrangular prism shape having the cylindrical hole 420.

For convenience of explanation, when it is assumed that the up/down direction of the housing holder 400 is defined based on FIG. 3, the upper end face side of the holder frame part 410 is an open side connecting to an atmospheric environment. The lower end face side of the holder frame part 410 is a sealed side airtightly hermetically closed by the holder base part 450.

On the upper end face side of the holder frame part 410, a flat flange part 411 is provided. The flange part 411 is used to connect to the piping for drawing wiring, for example. The piping is used to draw a signal line 350 of the detection head part 300. The flange part 411 is provided with a shallow groove 412 surrounding the cylindrical hole 420, and an O ring (a sealing or caulking agent) 413 is inserted in the shallow groove 412.

On the upper end face of the holder frame part 410, detector holding plates (detector holding parts) 421 are provided in such a manner as to protrude inside the cylindrical hole 420. Two detector holding plates 421 are provided at the diagonal positions of the cylindrical hole 420. The detection head part 300 is inserted into the cylindrical hole 420 from below the holder frame part 410, and then the detection head part 300 is fixed to the detector holding plates 421 with fixing screws 422.

The holder base part 450 is fixedly attached on the lower end face side of the holder frame part 410 with fixing screws 452, Between the holder base part 450 and the holder frame part 410, an O ring (a sealing or caulking agent) 451 is inserted. The fixing screws 452 are each provided with a hole for gas venting, On the upper face side of the holder base part 450, a recessed part corresponding to the detection head part 300 is provided.

The holder base part 450 includes a window part (relay means) 460 for transmitting light between the detection head part 300 and the scale 200.

Figure 4:
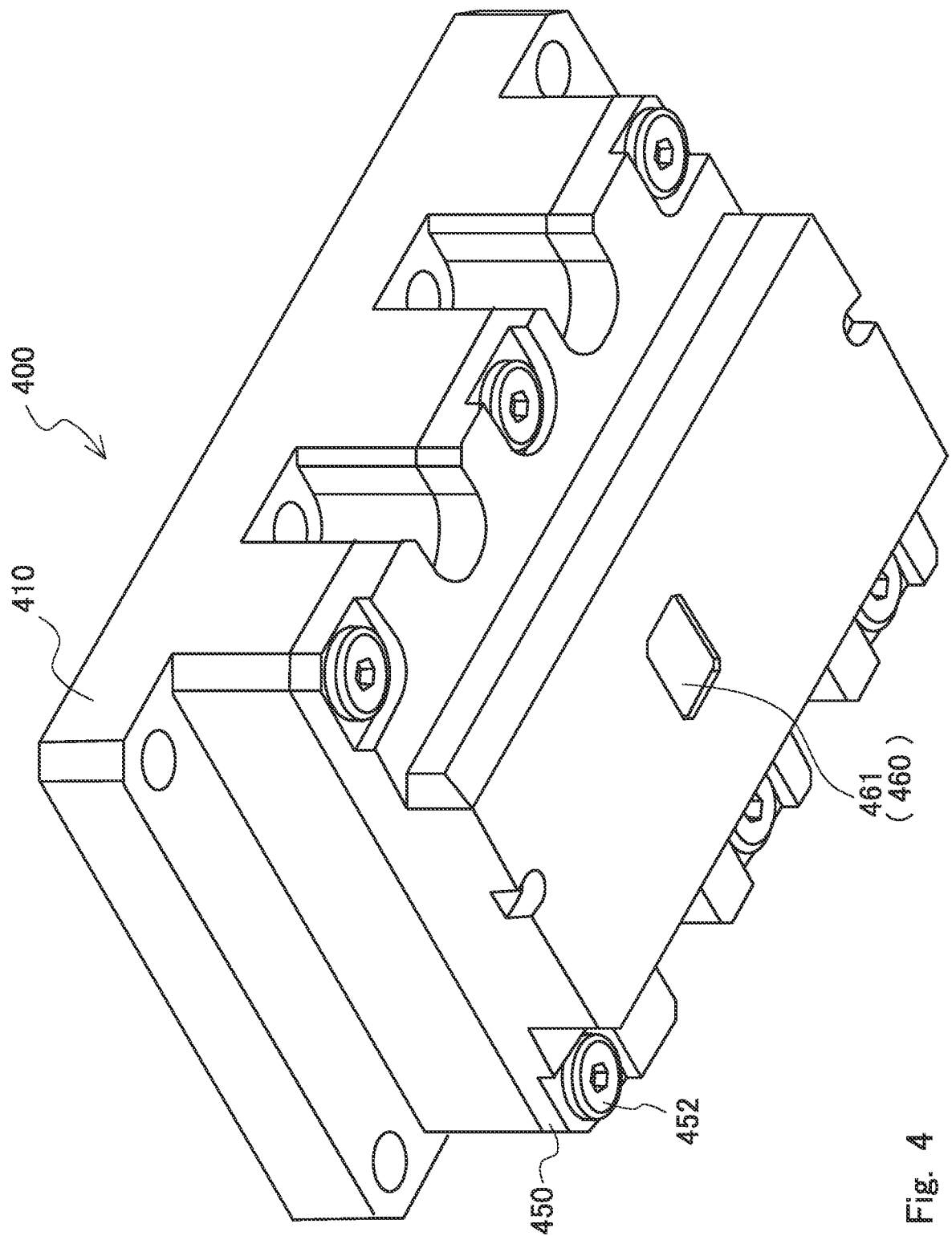
FIG. 4 is a diagram showing the housing holder when viewed from a lower face (bottom face) side.

FIG. 4 is a view of the housing holder 400 when viewed from the lower face (bottom face) side. The holder base part 450 is provided with a hole, and a glass plate 461 is attached to this hole to form a window part 460 that transmits light while keeping airtightness. The glass plate 461 may be provided with an anti-reflective film. Through the window part 460, the light from the detection head part 300 is applied on the scale 200, and the reflected light from the scale 200 passes through the window part 460 and returns to the detection head part 300.

With the displacement measuring apparatus 100 according to the present embodiment having such a structure, the following effects can be obtained.

(1) In the present embodiment, the scale 200 is disposed in a vacuum environment while the detection head part 300 is separated from the vacuum and is disposed in an atmospheric environment. Accordingly, if gas is generated from the detection head part 300, the gas from the detection head part 300 does not affect the vacuum level.

(2) To have the above structure described in (1), there is a problem that the gap between the detection head part 300 and the scale 200 is required to be widened.

In this regard, a bilateral telecentric optical system is employed as the optical system of the detection head part 300 in the present embodiment. Accordingly, since parallel light is applied from the detection head part 300 on the scale 200, it is possible to reduce the effects of widening or variation of the gap between the detection head part 300 and the scale 200 on the accuracy of reading the pattern of the scale 200.

(3) If the gap between the detection head part 300 and the scale 200 is widened and if the window part 460 is positioned between the detection head part 300 and the scale 200, there is a concern that the accuracy of reading the pattern by the detection head part 300 is affected to a certain extent.

In this regard, the scale 200 has the two tracks 221 and 222 with different kinds of patterns in the present embodiment. Specifically, one is an absolute-type pseudo random pattern for ensuring robustness, and the other is an increment-type pattern for ensuring responsiveness. Accordingly, it is possible for the vacuum-compatible displacement measuring apparatus 100 according to the present embodiment to maintain the same performance as an existing encoder.

(Modification)

In the above exemplary embodiment, a photoelectric encoder is described as an example, but an electrostatic capacitance encoder or an electromagnetic induction encoder may be employed as the detection principal of the encoder.

The electrostatic capacitance encoder is provided with a transmitting terminal and a receiving terminal on the detection head part side and with a coupling terminal on the scale side, and uses the capacitance (electric capacity) between the terminals (the transmitting terminal and the receiving terminal) on the detection head part side and the coupling terminal on the scale side that changes according to the relative displacement between the detection head part and the scale. In this case, the relay means provided to the holder base part 450 may be a dielectric. For example, the holder base part 450 may be provided with a hole, and the hole is provided with a thin dielectric plate. Since the distribution of the electric potential (electric field) of the transmitting terminal appears on the scale 200 side directly through the dielectric, one dielectric plate is only required.

On the other hand, a conductor can be used as the relay means, but the conductor needs to be divided into small pieces in this case.

For example, if a wide conductor plate is positioned between the terminals (the transmitting terminal and the receiving terminal) on the detection head part side and the coupling terminal on the scale side, the distribution of the electric potential of the transmitting terminal cannot be transmitted to the scale, and the transmitting terminal and the receiving terminal cannot be coupled in common to one conductor that is the relay means. In other words, when a conductor is used as the relay means, it is required that a relay conductor for the transmitting terminal is separated from a relay conductor for the receiving terminal and that the relay conductor for the transmitting terminal is separated at the same pitch as the transmitting terminal.

The electromagnetic induction encoder is provided with a transmitting coil (excitation coil) and a receiving coil (detection coil) on the detection head part side and with a coupling coil on the scale side, and uses the electromagnetic coupling (electromotive current due to electromagnetic coupling) between the coils (the transmitting coil and the receiving coil) on the detection head part side and the coupling coil on the scale side that changes according to the relative displacement between the detection head part and the scale. In this case, the relay means provided to the holder base part 450 may be a dielectric or a conductor, except for a magnetic substance.

Note that, the present invention is not limited to the above exemplary embodiments and can be appropriately modified without departing from the scope.

In the above exemplary embodiment, a bilateral telecentric optical system is employed, but a unilateral telecentric optical system in which only the object side is a telecentric optical system may be employed,

REFERENCE SIGNS

100 Displacement measuring apparatus
200 Scale
210 Scale substrate
221,222 Track
300 Detection head part
310 Objective lens unit
320 Imaging lens unit
330 Reception part
340 Casing
400 Housing holder
410 Holder frame part
411 Flange part
412 Shallow groove
413 O ring
420 Cylindrical hole
421 Detector holding plate
450 Holder base part
452 Fixing screw
460 Window part
461 Glass plate

The invention claimed is:

1. A displacement measuring apparatus comprising:
a scale having a scale pattern along a positioning direction; and
a detection head part disposed so as to be relatively displaceable to the scale along the positioning direction and to face the scale with a predetermined gap and configured to detect a displacement or position relative to the scale, wherein
the scale is disposed in a vacuum,
the detection head part is disposed in an atmosphere,
the detection head part is housed in a housing holder separating an atmospheric environment side from a vacuum environment side, and
the housing holder includes a relay means, said relay means being disposed in the predetermined gap between the detection head part and the scale, said relay means passing a detection signal between the detection head part and the scale.

2. The displacement measuring apparatus according to claim 1, wherein the displacement measuring apparatus is a photoelectric encoder, and the relay means is a light-transmissive window.

3. The displacement measuring apparatus according to claim 2, wherein the detection head part has a telecentric optical system.

4. The displacement measuring apparatus according to claim 2, wherein the scale has a pseudo random pattern.

5. The displacement measuring apparatus according to claim 1, wherein the scale is a glass scale.

6. The displacement measuring apparatus according to claim 1, wherein the displacement measuring apparatus is an electrostatic capacitance encoder, and the relay means is a dielectric or a divided conductor.

7. The displacement measuring apparatus according to claim 1, wherein the displacement measuring apparatus is an electromagnetic induction encoder, and the relay means is a dielectric or a conductor, except for a magnetic substance.

8. A method of installing the displacement measuring apparatus according to claim 1, the method comprising:

disposing the scale in a vacuum environment;

housing the detection head part in a housing holder separating an atmospheric environment side from a vacuum environment side; and disposing an assembly of the housing holder housing the detection head part in such a manner as to face the scale with a predetermined gap.

* * * * *